(12) United States Patent
Baba et al.

(10) Patent No.: US 8,054,017 B2
(45) Date of Patent: Nov. 8, 2011

(54) APPARATUS FOR ESTIMATING ROTOR POSITION OF BRUSHLESS MOTORS AND SYSTEM AND METHOD FOR CONTROLLING START-UP OF BRUSHLESS MOTORS

(75) Inventors: Hiroyasu Baba, Nishio (JP); Yuji Hayashi, Kasugai (JP); Naoki Yamamoto, Takahama (JP); Kiyoshi Nagata, Nagoya (JP); Masaya Ootake, Kariya (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 413 days.

(21) Appl. No.: 12/469,169

(22) Filed: May 20, 2009

(65) Prior Publication Data

US 2009/0289586 A1 Nov. 26, 2009

(30) Foreign Application Priority Data

May 22, 2008 (JP) ................................. 2008-134193

(51) Int. Cl.
*H03K 5/00* (2006.01)
*H02P 6/04* (2006.01)
(52) U.S. Cl. .............................. 318/400.13; 318/400.11
(58) Field of Classification Search ............ 318/400.01–400.04, 400.06, 400.1, 400.11, 400.13
See application file for complete search history.

(56) References Cited

U.S. PATENT DOCUMENTS

| | | | |
|---|---|---|---|
| 4,876,491 A | 10/1989 | Squires et al. | |
| 5,012,166 A * | 4/1991 | Ushijima et al. | 318/400.13 |
| 5,115,174 A | 5/1992 | Masuda et al. | |
| 5,608,300 A | 3/1997 | Kawabata et al. | |
| 6,670,784 B2 * | 12/2003 | Odachi et al. | 318/700 |
| 7,084,598 B2 * | 8/2006 | Yoshida et al. | 318/400.11 |
| 7,412,339 B2 * | 8/2008 | Ramu et al. | 702/65 |
| 7,518,328 B2 * | 4/2009 | Balsiger | 318/400.22 |
| 7,859,207 B2 * | 12/2010 | Yamada et al. | 318/400.02 |
| 2005/0280382 A1 * | 12/2005 | Viti | 318/254 |
| 2008/0048598 A1 * | 2/2008 | Shibuya | 318/400.1 |
| 2010/0066284 A1 * | 3/2010 | Iwaji et al. | 318/400.02 |

FOREIGN PATENT DOCUMENTS

| | | | |
|---|---|---|---|
| JP | 2000-069789 | * | 3/2000 |
| JP | 2006-069789 | | 3/2000 |

OTHER PUBLICATIONS

Japanese Office Action dated Jan. 25, 2010, issued in corresponding Japanese Application No. 2008-134193, with English translation.
Japanese Decision of Refusal dated Aug. 2, 2010, issued in corresponding Japanese Application No. 2008-134193, with English translation.

* cited by examiner

*Primary Examiner* — Thomas Dougherty
(74) *Attorney, Agent, or Firm* — Nixon & Vanderhye PC

(57) ABSTRACT

An apparatus for estimating rotor position for brushless motors capable of accurately estimating rotor position is provided. The apparatus may be used as a start-up system for brushless motors. The apparatus performs accurate estimation even though power source voltage fluctuates, and is able to provide compact configuration. The apparatus supplies voltage to the coils respectively. In each supplying period, the apparatus counts voltage supply period of time until current value reaches to a current threshold value. Since a coil indicative of rotor stop position is prone to be magnetically saturated. The apparatus estimates the rotor stop position based on the voltage supply periods. Then, the apparatus starts a switching sequence based on the rotor stop position.

17 Claims, 8 Drawing Sheets

|    | Su+ | Sv+ | Sw+ | Su- | Sv- | Sw- |
|----|-----|-----|-----|-----|-----|-----|
| V1 | ON  | OFF | OFF | OFF | ON  | ON  |
| V2 | ON  | ON  | OFF | OFF | OFF | ON  |
| V3 | OFF | ON  | OFF | ON  | OFF | ON  |
| V4 | OFF | ON  | ON  | ON  | OFF | OFF |
| V5 | OFF | OFF | ON  | ON  | ON  | OFF |
| V6 | ON  | OFF | ON  | OFF | ON  | OFF |

| DIRECTION | V1 | V2 | V3 | V4 | V5 | V6 |
|---|---|---|---|---|---|---|
| ROTOR POSITION | I | II | III | IV | V | VI |
| COMMUTATION DIRECTION | 30deg | 90deg | 150deg | 210deg | 270deg | 330deg |

|  | Su+ | Sv+ | Sw+ | Su− | Sv− | Sw− |
|---|---|---|---|---|---|---|
| 30deg | ON | OFF | OFF | OFF | OFF | ON |
| 90deg | OFF | ON | OFF | OFF | OFF | ON |
| 150deg | OFF | ON | OFF | ON | OFF | OFF |
| 210deg | OFF | OFF | ON | ON | OFF | OFF |
| 270deg | OFF | OFF | ON | OFF | ON | OFF |
| 330deg | ON | OFF | OFF | OFF | ON | OFF |

APPARATUS FOR ESTIMATING ROTOR POSITION OF BRUSHLESS MOTORS AND SYSTEM AND METHOD FOR CONTROLLING START-UP OF BRUSHLESS MOTORS

CROSS REFERENCE TO RELATED APPLICATION

This application is based on Japanese Patent Application No. 2008-134193 filed on May 22, 2008, the contents of which are incorporated herein by reference in its entirety.

FIELD OF THE INVENTION

The present invention relates to a technology for estimating the rotor position of a brushless motor and in particular to a technology for performing start-up of brushless motors.

BACKGROUND OF THE INVENTION

There have been conventionally known brushless motors in which a coil is placed on the stator side and a rotor having magnetic poles is rotated and thus a brush in contact with the rotor is eliminated. In such a brushless motor, it is required to estimate the position where the rotor is at a stop (hereafter, referred to as "rotor position") when the motor is started. However, it is difficult to estimate rotor position unlike in motors having a brush.

The simplest method for estimating the rotor position of a brushless motor is to detect it with a sensor. In this case, however, increase in the number of parts and other like problems result. To cope with this, there have been conventionally proposed methods of supplying voltage to a coil installed in a stator and estimating the rotor position from change in the current passed through the coil. Refer to Patent Document 1, for example.

In the technology disclosed in the above patent document, rotor position is estimated by: supplying voltage so that magnetic flux in the direction perpendicular to the direction of rotation of a rotor is produced at predetermined angular intervals; and measuring the magnitude of wiring current that is the current passed through a coil. More specific description will be given. When so-called magnetic saturation, in which change in magnetic flux density is reduced even though current is increased, occurs in a coil, the inductance of the coil under a certain voltage is reduced. For this reason, a phenomenon of increase in current occurs. At this time, magnetic saturation is prone to occur by the magnetic flux produced by the rotor itself at an angle corresponding to the rotor position. In conventional technologies, therefore, rotor position is estimated by: supplying voltage more than once so that the direction of magnetic flux is changed at predetermined angular intervals; and detecting the wiring current in each case and comparing the peak of the wiring current.

[Patent Document 1] JP-A-S63-69489 (U.S. Pat. No. 4,876,491)

It will be assumed that a brushless motor is used for a vehicle fuel pump. In this case, voltage supplied to a coil is from a vehicle battery and thus there is a possibility of fluctuation in voltage. For example, voltage drop may be caused by vehicle electric equipment or voltage rise may be caused by a battery externally connected at the time of failure or the like.

In the technology disclosed in Patent Document 1, the coil may not be magnetically saturated at a low voltage condition when a significant voltage drop is generated, since a voltage supplying period for generating magnetic flux is maintained constant. In the case that the coil is not saturated magnetically, degradation in the accuracy of rotor position estimation may be occurred by using a method comparing peak values of winding current, since a current increase becomes smaller.

On the other hand, in a high voltage condition when a voltage rise is caused, current value is increased as well as voltage value. For this reason, it is necessary to make circuit elements such as the coils and the switches performing the voltage supply capable of withstanding large current. Consequently, the system may become bigger.

SUMMARY OF THE INVENTION

The invention has been made to solve the above-mentioned problem.

It is an object of the invention to enable an accurate estimation of rotor position even though power source voltage fluctuates, and to achieve a compact arrangement.

In one of preferred embodiments of the present invention, an apparatus for estimating rotor position for brushless motors is provided. The brushless motor has a stator with coils wound thereon and a rotor rotatably supported relative to the stator. The apparatus estimates the stop position of the rotor. The estimating apparatus comprises, a current detecting means for directly or indirectly detecting wiring current which is current passed through the coils, a voltage supplying means capable of supplying voltage to the coils so that magnetic flux is produced in each of a plurality of directions perpendicular to the direction of rotation of the rotor, a voltage supply controlling means which controls the voltage supplying means so that magnetic flux is produced in sequence in predetermined directions among the directions and, when the wiring current detected at the current detecting means exceeds a predetermined threshold value, terminates the supply of voltage by the voltage supplying means, a supply period acquiring means which acquires a period equivalent value equivalent to a voltage supply period in each direction in which magnetic flux is produced under control of the voltage supply controlling means, and a rotor position estimating means which compares period equivalent values to identify a direction in which the voltage supply period is minimized and estimates the stop position of the rotor based on the identified direction.

According to the estimating apparatus, the voltage is supplied to the stator coil for each one of the predetermined direction. The voltage is supplied until current value reaches to a predetermined threshold. Simultaneously, a period of time from beginning of voltage supply to terminating voltage supply is detected. The predetermined threshold can be set at a value where the coil reaches to a magnetically saturated condition. The period equivalent values enable to determine the stop position of the rotor even if the power source voltage is fluctuated during the voltage supplying sequence. Further it is possible to saturate the stator coil and enable to avoid lowering of estimating accuracy.

In one of preferred embodiments of the present invention, a start-up control system for brushless motors is provided. The brushless motor has a stator with coils wound thereon and a rotor rotatably supported relative to the stator. The system carries out start-up control on the brushless motor. The control system comprises, a current detecting means for directly or indirectly detecting wiring current which is current passed through the coils, a voltage supplying means capable of supplying voltage to the coils so that magnetic flux is produced in each of a plurality of directions perpendicular to the direction of rotation of the rotor, a voltage supply controlling means which controls the voltage supplying means so that magnetic flux is produced in sequence in predetermined directions among the directions and, when the wiring current detected at the current detecting means exceeds a predetermined threshold value, terminates the supply of voltage by the voltage supplying means, a supply period acquiring means which acquires a period equivalent value equivalent to a voltage supply period in each direction in which magnetic flux is produced under control of the voltage supply controlling means, and a rotor position estimating means which compares period equivalent values to identify a direction in which the voltage supply period is minimized and estimates the stop position of the rotor based on the identified direction. The system further comprises a motor start-up controlling means which determines a direction of magnetic flux for causing commutation in the rotor from among the directions based on the stop position of the rotor estimated at the rotor position estimating means, and controls the voltage supplying means so as to produce magnetic flux in that direction and starts the brushless motor.

According to the start-up control system, the period equivalent values enable to determine the stop position of the rotor even if the power source voltage is fluctuated during the voltage supplying sequence. It is possible to start the brushless motor based on the estimated stop position of the rotor.

In one of preferred embodiments of the present invention, a start-up control method for brushless motors is provided. The brushless motor has a stator with coils wound thereon and a rotor rotatably supported relative to the stator. The method is used to carry out start-up control on the brushless motor. The control method comprises, first step of supplying voltage to the coils so that magnetic flux is produced in predetermined directions among a plurality of directions perpendicular to the direction of rotation of the rotor and starting counting at the same time, second step of determining that wiring current which is current passed through the coils has exceeded a predetermined threshold value, third step of, when the wiring current is determined to have exceeded the predetermined threshold value, terminating the supply of the voltage and terminating counting, fourth step of repeating the steps including the first step to the third step in all the predetermined directions. The method further comprises, fifth step of estimating the stop position of a rotor based on a direction in which the count is minimized from among the predetermined directions, and sixth step of determining a direction of magnetic flux for causing commutation in the rotor from among the directions based on the estimated stop position of the rotor, and controlling the voltage supplying means so as to produce magnetic flux in that direction and starting the brushless motor.

According to the start-up control method, the period equivalent values enable to determine the stop position of the rotor even if the power source voltage is fluctuated during the voltage supplying sequence. It is possible to start the brushless motor based on the estimated stop position of the rotor.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

Hereafter, description will be given to embodiments of the invention with reference to the drawings.

First Embodiment

Figure 1:
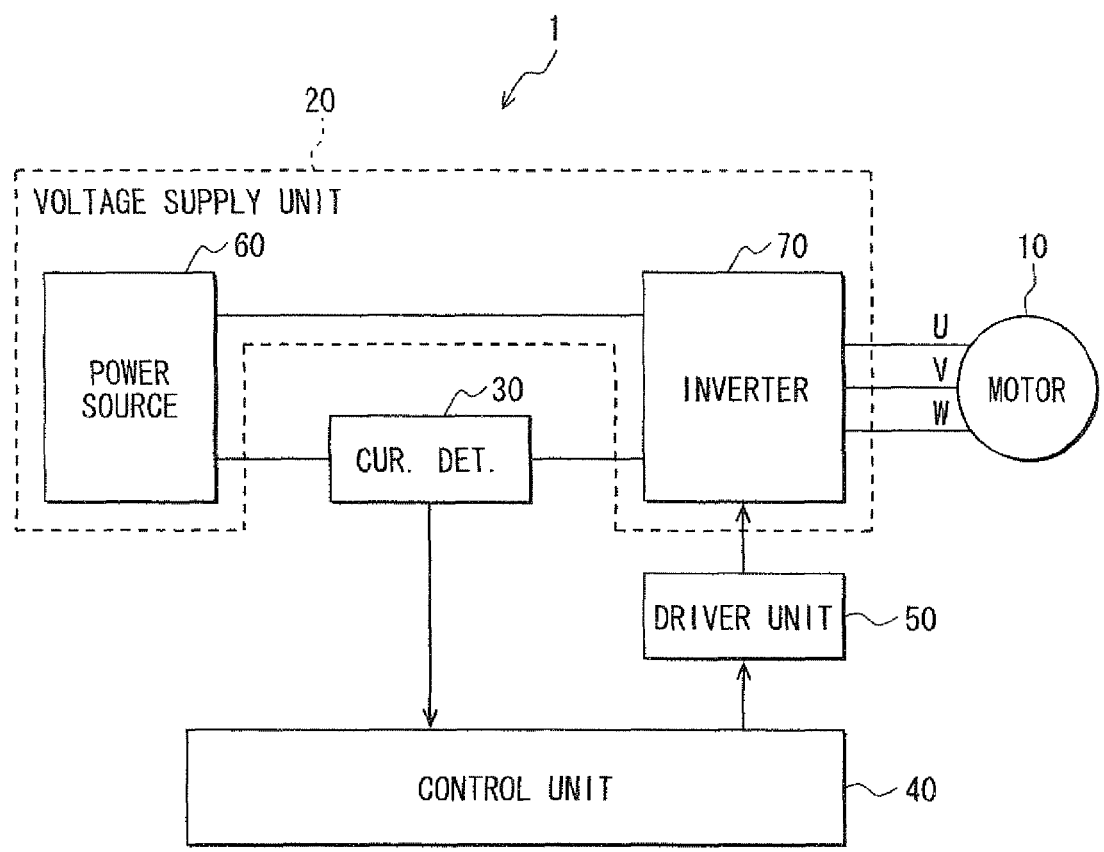
FIG. 1 is a block diagram illustrating a start-up control system for brushless motors in first embodiment of the invention.

FIG. 1 is a block diagram illustrating the general configuration of a start-up control system 1 for brushless motors in the first embodiment. The start-up control system 1 for brushless motors in this embodiment is used to drive a vehicle fuel pump.

The start-up control system 1 for brushless motors includes a motor 10, a voltage supply unit 20, a current detection unit 30, a control unit 40, and a driver circuit 50.

Figures 4A, 4B:
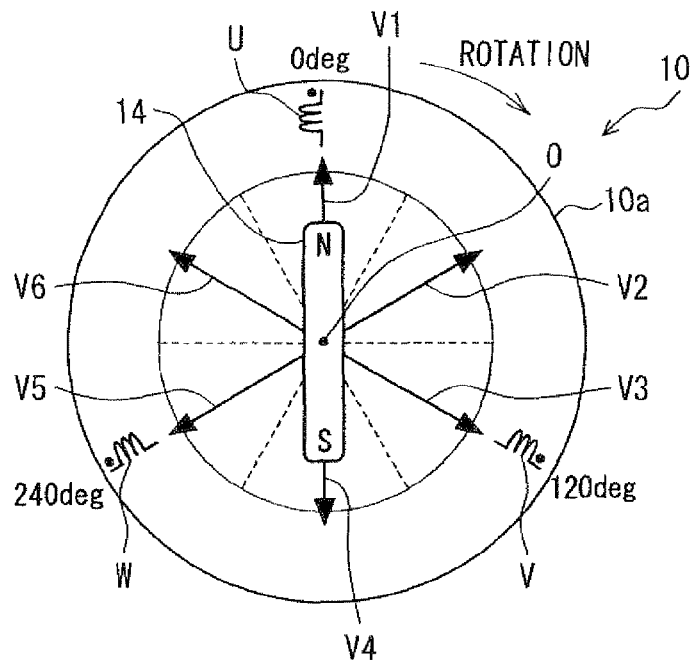
FIG. 4A is an explanatory drawing illustrating the directions of voltage supply in the first embodiment.
FIG. 4B is an explanatory drawing illustrating switching of FETs corresponding to the directions of voltage supply.

The motor 10 is a so-called brushless motor and has a stator 10a and a rotor 14 (FIG. 4A) that is rotated against the stator 10a. The rotor 14 is supported rotatably relative to the stator 10a. The rotor 14 in FIG. 4A is depicted like a rod; however, the actual rotor is a disk-shaped or cylindrical member and a permanent magnet is stuck to its surface so that it has magnetic poles. In FIG. 4A, the rotor 14 is schematically depicted as having a north pole and a south pole. The stator 10a houses the rotor 14 therein and rotatably supports it. The rotor 14 illustrated in FIG. 4A is rotated clockwise with the point O taken as the center of rotation.

Description will be back to FIG. 1. The voltage supply unit 20 includes a power source 60 and an inverter 70. The voltage supply unit 20 may be called as a power supply unit. The power source 60 is a vehicle battery. Voltage produced by this power source 60 will be hereafter referred to as "power source voltage." The inverter 70 is a switching circuit for supplying voltage to a coil wound on the stator of the motor 10.

The current detection unit 30 is electrically connected between the power source 60 and the inverter 70 and detects current passed through a coil. In more detail, it detects voltage in proportion to current.

The control unit 40 controls the inverter 70 through the driver circuit 50. Measurement value from the current detection unit 30 is inputted to the control unit 40.

Figure 2:
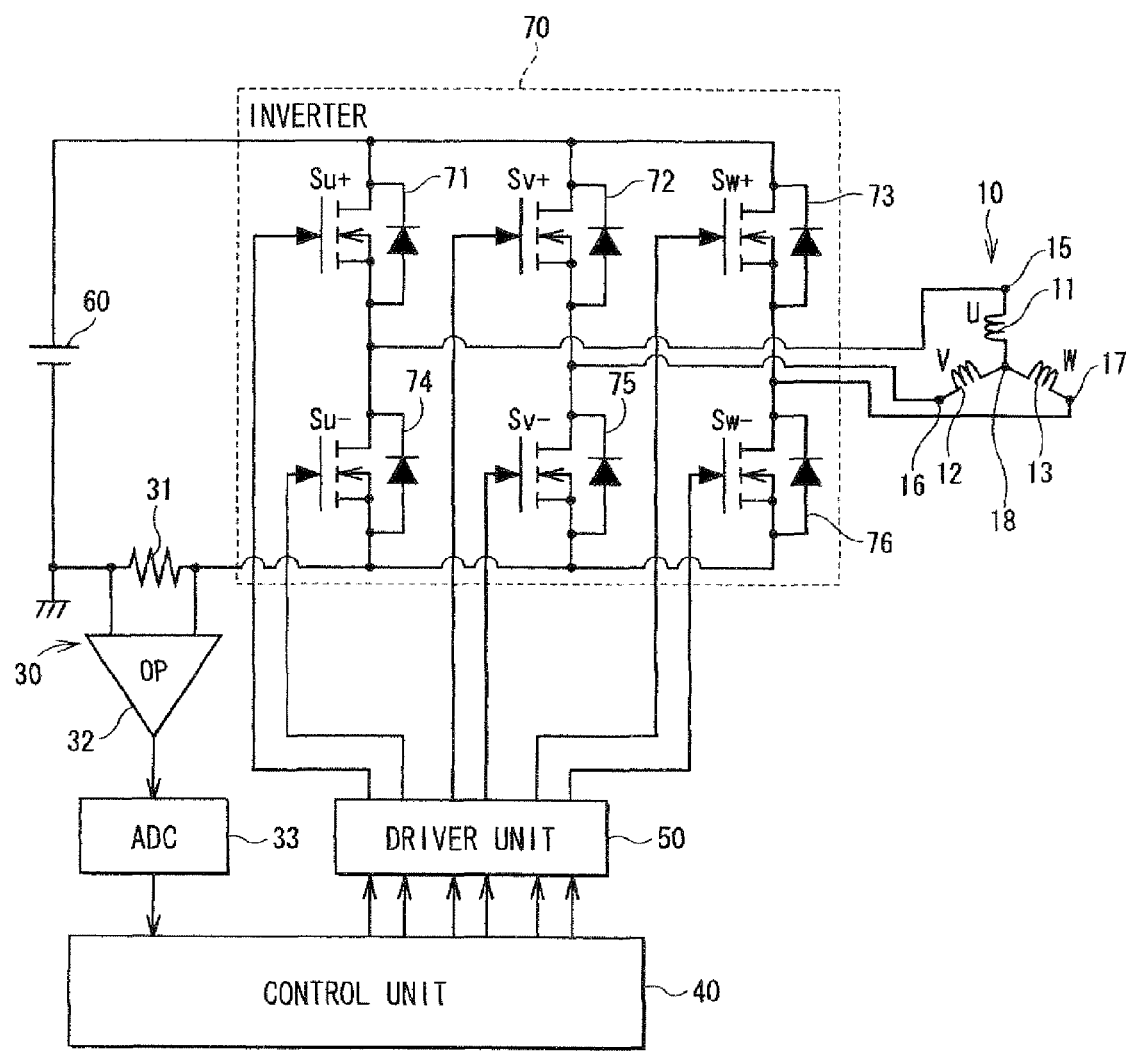
FIG. 2 is a circuit diagram illustrating a start-up control system for brushless motors in the first embodiment of the invention.

Description will be given to the circuitry of the start-up control system 1 for brushless motors with reference to FIG. 2.

As mentioned above, the motor 10 has a stator and a rotor. This stator has protruded portions protruded inward in the radial direction at predetermined angular intervals and three phase coils 11, 12, 13 are wound on these protruded portions. Specifically, a U-phase coil 11, a V-phase coil 12, and a W-phase coil 13 are wound. It is the above-mentioned inverter 70 to change the mode of voltage supply to the three phase coils 11, 12, 13.

The inverter 70 is constructed of six MOSFETs (Metal Oxide-Semiconductor Field-Effect Transistors) 71, 72, 73, 74, 75, 76, each of which is a type of field-effect transistor. These MOSFETs 71 to 76 function as switching elements and the section between their respective source and drain is turned ON (brought into conduction) or OFF (interrupted) according to the potential of their respective gates. Hereafter, the MOSFETs 71 to 76 will be described simply as FETs 71 to 76. When it is required to discriminate each of the six FETs 71 to 76 from the others, the symbols in FIG. 2 will be used and they will be described as FET(Su+) 71, FET(Sv+) 72, FET(Sw+) 73, FET(Su−) 74, FET(Sv−) 75, and FET(Sw−) 76.

Description will be given to the connection between the FETs 71 to 76. The drains of three FETs 71 to 73 are connected to power source voltage. The sources of these FETs 71 to 73 are respectively connected to the drains of the remaining three FETs 74 to 76. The sources of these FETs 74 to 76 are grounded through a shunt resistor 31. The gates of the six FETs 71 to 76 are connected to six output terminals of the driver circuit 50. Owing to this configuration, the control unit 40 can individually switch the six FETs 71 to 76 between ON and OFF through the driver circuit 50.

The point of junction between the FET(Su+) 71 and the FET(Su−) 74 is connected to one end 15 of the U-phase coil 11. The point of junction between the FET(Sv+) 72 and the FET(Sv−) 75 is connected to one end 16 of the V-phase coil 12. The point of junction between the FET(Sw+) 73 and the FET(Sw−) 76 is connected to one end 17 of the W-phase coil 13. The other ends of the U-phase coil 11, V-phase coil 12, and W-phase coil 13 are connected together to form other end portion 18.

The current detection unit 30 includes the shunt resistor 31, an operational amplifier 32 (hereinafter referred to as an OP amp 32), and an analog to digital converter 33 (hereinafter referred to as an ADC 33).

Both input terminals of the OP amp 32 are connected to the ends of the shunt resistor 31 respectively. Therefore, the OP amp 32 detects voltage drop between the both ends of the shunt resistor 31, and outputs the voltage drop after amplifying. The output of the OP amp 32 is connected to the ADC 33. The output of the ADC 33 is connected to the input of the control unit 40. As a result, the output signal of the OP amp 32 is inputted into the control unit 40 as a digital signal.

Description will be given to the operation of the start-up control system 1 for brushless motors in this embodiment.

Figure 3:
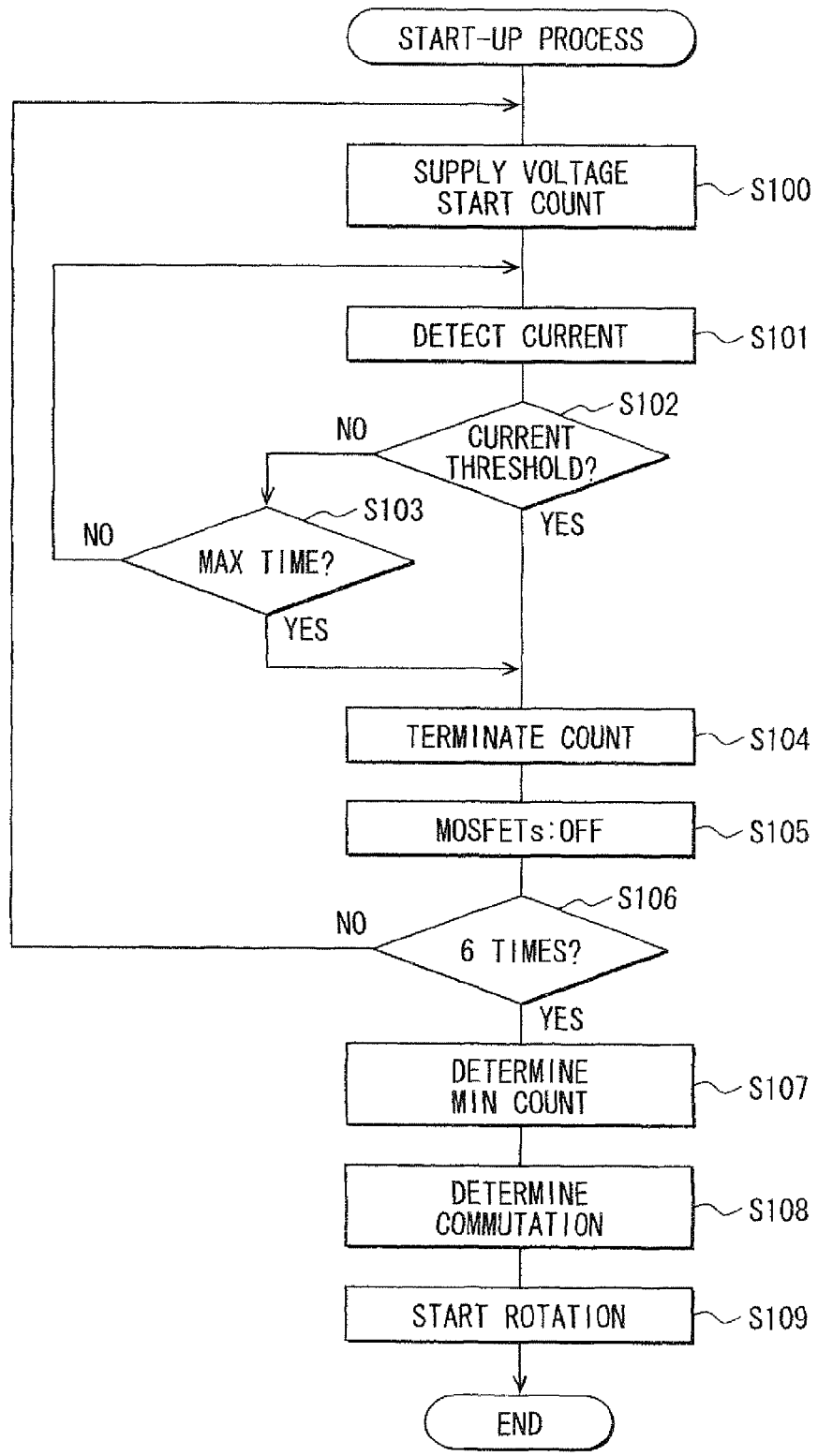
FIG. 3 is a flowchart illustrating start-up processing carried out by a control unit in the first embodiment.

FIG. 3 is a flowchart illustrating start-up processing carried out at the control unit 40. At the first step, Step S100, voltage is supplied. Hereafter, "Step" will be omitted and each step will be simply indicated by symbol S. This processing is achieved by supplying voltage to the three phase coils 11, 12, 13 wound on the stator of the motor 10.

Description will be given to voltage supply to the three phase coils 11, 12, 13 with reference to FIGS. 4A and 4B.

FIG. 4A is an explanatory drawing illustrating the directions of magnetic flux produced by supplying voltage to the three phase coils 11, 12, 13. The directions of magnetic flux produced by voltage supply are set clockwise at intervals of 60 degrees. In FIG. 4A, the directions of magnetic flux are indicated by arrows V1, V2, V3, V4, V5, and V6. These lines of magnetic flux can be produced by varying the mode of voltage supply by appropriately combining turn-ONs and -OFFs of the FETs 71 to 76. To produce magnetic flux in the direction indicated by arrow V1 in FIG. 4A, for example, the FETs are turned ON or OFF as illustrated in FIG. 4B. That is, the FET(Su+) 71 is turned ON; the FET(Sv+) 72 is turned OFF; the FET(Sw+) 73 is turned OFF; the FET(Su−) 74 is turned OFF; the FET(Sv−) 75 is turned ON; and the FET (Sw−) 76 is turned ON. In this case, power source voltage is supplied to the one end 15 of the U-phase coil 11 and the one ends 16, 17 of the V-phase coil 12 and the W-phase coil 13 are brought to low potential. Therefore, current flows from the U-phase coil 11 to the other end portion 18 to the V-phase coil 12 and the W-phase coil 13. As a result, magnetic flux in the direction indicated by arrow V1 is produced. To produce magnetic flux in the direction indicated by arrow V2, the FETs 71 to 76 are respectively turned ON, ON, OFF, OFF, OFF, and ON as illustrated in FIG. 4B. Similarly, magnetic flux in the direction indicated by arrow V3 is produced by respectively turning OFF, ON, OFF, ON, OFF, and ON the FETs 71 to 76. Magnetic flux in the direction indicated by arrow V4 is produced by respectively turning OFF, ON, ON, ON, OFF and OFF the FETs 71 to 76; magnetic flux in the direction indicated by arrow V5 is produced by respectively turning OFF, OFF, ON, ON, ON, and OFF the FETs 71 to 76; and magnetic flux in the direction indicated by arrow V6 is produced by respectively turning ON, OFF, ON, OFF, ON, and OFF the FETs 71 to 76. In the following description, the direction of magnetic flux produced by voltage supply will be referred to as "voltage supplying direction." When the directions of arrows V1 to V6 are specially cited, they will be referred to as voltage supplying direction V1, voltage supplying direction V2, voltage supplying direction V3, voltage supplying direction V4, voltage supplying direction V5, and voltage supplying direction V6.

In this example, first, voltage is supplied in the voltage supplying direction V1 in FIG. 4A. Counting is started when this voltage is supplied. The counting is carried out based on the operating clock of the control unit 40.

At S101, subsequently, current response detection is carried out. This processing is achieved by acquiring the result of measurement from the ADC 33.

At S102, subsequently, it is determined whether or not a current threshold value has been reached. The current threshold value is predetermined and set within a range in which the three phase coils 11, 12, 13 are magnetically saturated. When it is determined at this step that the current threshold value has been reached (S102: YES), the flow proceeds to S104. When it is determined that the current threshold value has not been reached yet (S102: NO), the flow proceeds to S103.

At S103, it is determined whether or not a maximum voltage supply time has passed. When it is determined at this step that the maximum voltage supply time has passed (S103: YES), the flow proceeds to S104. The processing of S101 and the following steps is repeated as long as the maximum voltage supply time does not pass (S103: NO).

At S104, the counting initiated at S100 is terminated.

At S105, all of the FETs 71 to 76 are turned off. The processing is implemented by bringing the respective gates of the FETs 71 to 76 to a predetermined potential through the driver circuit 50.

At S106, subsequently, it is determined whether or not the number of times of voltage supply is "6." This processing is carried out to determine whether or not voltage has been supplied in all the voltage supplying directions V1 to V6. When the number of times of voltage supply is equal to "6" (S106: YES), the flow proceeds to S107. When the number of times of voltage supply is not equal to "6" (S106: NO), the processing of S100 and the following steps is repeated. As the result of the processing of S100 and the following steps being repeated, voltage is supplied in the order of voltage supplying direction V1 to V2 to V3 to V4 to V5 to V6.

At S107, a voltage supplying direction in which the count is minimized is searched for. This processing is achieved by searching for the voltage supplying direction in which the count is minimized from among the voltage supplying directions V1 to V6. At S108, subsequently, a voltage supplying direction in which forced commutation should be carried out is determined. At S109, subsequently, the motor 10 is started and then this start-up processing is terminated.

To make the above-mentioned start-up processing more understandable, concrete description will be added with reference to FIGS. 5A to 5C, and FIGS. 6A to 6C. First, description will be given to the processing of up to S107 with reference to FIGS. 5A to 5C, and then to the processing of S108 and S109 with reference to FIGS. 6A to 6C.

Figure 5A:
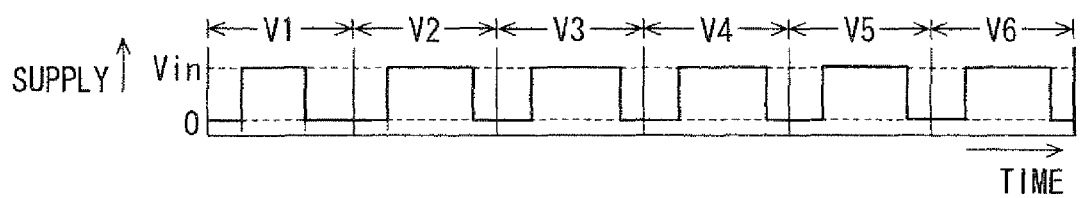
FIGS. 5A, 5B, and 5C are graphs attached as explanatory drawings illustrating the correspondence between the directions of voltage supply, power source voltage, wiring current and number of count.
Figure 5B:
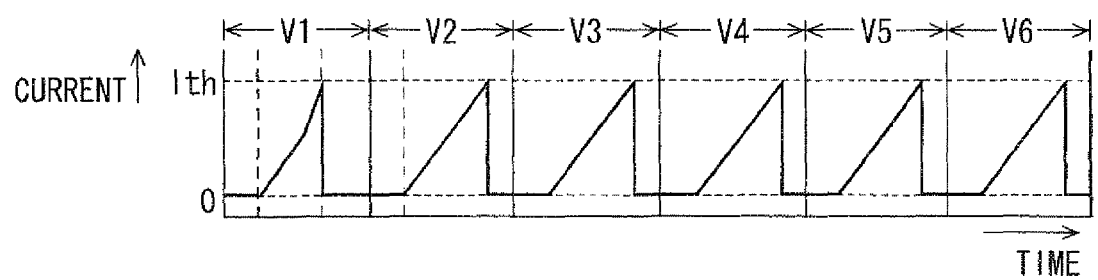
Figure 5C:
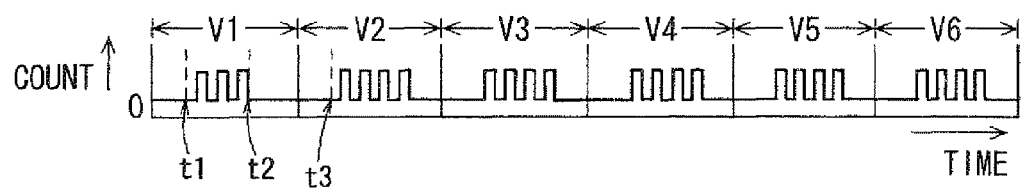

FIGS. 5A to 5C are explanatory drawings illustrating voltage supplying directions, supplied voltage, wiring current, and count signal in correspondence with one another. Here, the description will be given on the assumption that the supplied voltage is constant at a value Vin, and the current threshold is set at a value Ith.

First, it is initiated to supply voltage at time t1 by S100. Simultaneously, it is initiated to count a supplying period of time at time t1 by S100. The current of the three phase coils 11, 12, 13 steadily increases. When a current value reaches to the current threshold value Ith at time t2, the counting is terminated by S104, and the supply of voltage is terminated by S105. In this example, a count is obtained by counting the count signal (for example, rising edges thereof) during this voltage supply period. For example, number of count for the direction V1 is obtained and memorized. Since voltage has been supplied only in one direction at this time, voltage is supplied in another direction at time t3. For example, voltage is supplied in the next direction V2, and number of count for the direction V2 is obtained and memorized.

Thus, the processing is repeated so that voltage is supplied in all the voltage supplying directions V1 to V6. When voltage is supplied in the voltage supplying direction V6 and the number of times of voltage supply reaches "6" (S106: YES), a voltage supplying direction in which the number of count is maximized is searched for (S107). In the example in FIGS. 5A to 5C, number of the count in the voltage supplying direction V1 is "3" and is minimum among the other number of the count for the voltage supplying directions V1 to V6. Therefore, it is estimated that the north pole of the rotor 14 is positioned in the voltage supplying direction V1 (strictly within a predetermined angular range with this direction at the center).

Figures 6A, 6B, 6C:
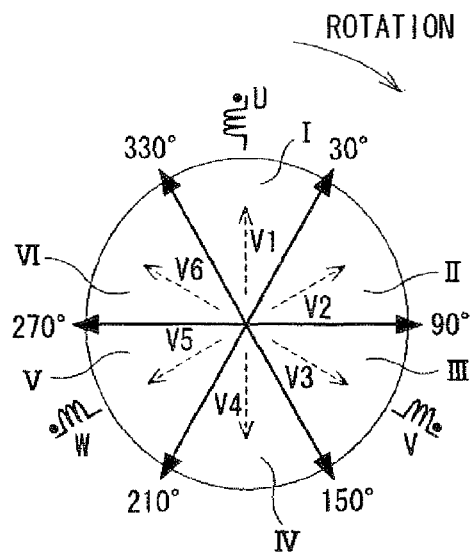
FIG. 6A is an explanatory drawing illustrating the directions of commutation voltage supply in the first embodiment.
FIG. 6B is an explanatory drawing illustrating the correspondence between the directions of voltage supply, the ranges of estimated rotor position, and the directions of commutation voltage supply in the first embodiment.
FIG. 6C is an explanatory drawing illustrating switching of FETs corresponding to the directions of commutation voltage supply.

FIG. 6A is an explanatory drawing illustrating directions (hereafter, referred to as "commutation voltage supplying direction") in which magnetic flux is produced for causing forced commutation in the rotor 14. FIG. 6B is an explanatory drawing illustrating the correspondence between the voltage supplying directions in which the time it takes to reach a current threshold value is minimized, the ranges of estimated rotor position, and commutation voltage supplying directions. FIG. 6C is an explanatory drawing illustrating turn-ONs and -OFFs of the FETs 71 to 76 corresponding to the commutation voltage supplying directions.

As illustrated in FIG. 6A, the commutation voltage supplying directions are respectively set in positions shifted by 30 degrees from the voltage supplying directions V1 to V6. When 0 degree is taken as the voltage supplying direction V1, specifically, the commutation voltage supplying directions are set in the directions of 30 degrees, 90 degrees, 150 degrees, 210 degrees, 270 degrees, and 330 degrees. Hereafter, the commutation voltage supplying directions will be indicated as 30 deg, 90 deg, 150 deg, 210 deg, 270 deg, and 330 deg.

As mentioned above, the direction in which the count is minimized is searched for from among the voltage supplying directions V1 to V6 (S107 of the flow in FIG. 3). At this time, it is estimated that the north pole of the rotor 14 is positioned within the range of plus/minus 30 degrees of this direction, that is, within the range of 60 degrees. This range of estimated rotor position is as indicted as I, II, III, IV, V, and VI in FIG. 6A. When the voltage supplying direction in which the count is minimized is V1, for example, as illustrated in FIG. 6B, it is estimated that the range of estimated rotor position is I. Similarly, when the voltage supplying direction is V2, it is estimated that the range of estimated rotor position is the range of II; when the voltage supplying direction is V3, it is estimated that the range of estimated rotor position is the range of III; when the voltage supplying direction is V4, it is estimated that the range of estimated rotor position is the range of IV; when the voltage supplying direction is V5, it is estimated that the range of estimated rotor position is the range of V; and when the voltage supplying direction is V6, it is estimated that the range of estimated rotor position is the range of VI.

When the range of estimated rotor position is I, the commutation voltage supplying direction is 30 deg as illustrated in FIG. 6B. That is, commutation is caused clockwise in the rotor 14 by producing magnetic flux in the position closest to the estimated rotor range I in the clockwise direction. Similarly, when the range of estimated rotor position is II, the commutation voltage supplying direction is 90 deg. When the range of estimated rotor position is III, the commutation voltage supplying direction is 150 deg; when the range of estimated rotor position is IV, the commutation voltage supplying direction is 210 deg; when the range of estimated rotor position is V, the commutation voltage supplying direction is 270 deg; and when the range of estimated rotor position is VI, the commutation voltage supplying direction is 330 deg.

The commutation voltage supplying direction is determined based on the above correspondence (S108 of the flow in FIG. 3) and voltage is supplied to start the motor 10 (S109). Specifically, magnetic flux in each commutation voltage supplying direction is produced by switching the FETs 71 to 76 to change the mode of voltage supply to the U-phase coil 11, V-phase coil 12, and W-phase coil 13 as illustrated in FIG. 5C.

When the commutation voltage supplying direction is 30 deg, for example, the FETs are turned ON or OFF as illustrated in FIG. 6C. That is, the FET(Su+) 71 is turned ON; the FET(Sv+) 72 is turned OFF; the FET(Sw+) 73 is turned OFF; the FET(Su−) 74 is turned OFF; the FET(Sv−) 75 is turned OFF; and the FET(Sw−) 76 is turned ON. In this case, power source voltage is supplied to the one end 15 of the U-phase coil 11 and the one end 17 of the W-phase coil 13 is brought to low potential. (Refer to FIG. 2.) Therefore, current flows from the U-phase coil 11 to the other end portion 18 to the W-phase coil 13. As a result, magnetic flux is produced for the commutation voltage supplying direction of 30 deg. When the commutation voltage supplying direction is 90 deg, the FETs 71 to 76 are respectively turned OFF, ON, OFF, OFF, OFF, and ON as illustrated in FIG. 6C. Similarly, magnetic flux for the commutation voltage supplying direction of 150 deg is produced by respectively turning OFF, ON, OFF, ON, OFF, and OFF the FETs 71 to 76. Magnetic flux for the commutation voltage supplying direction of 210 deg is produced by respectively turning OFF, OFF, ON, ON, OFF, and OFF the FETs 71 to 76; magnetic flux for the commutation voltage supplying direction of 270 deg is produced by respectively turning OFF, OFF, ON, OFF, ON, and OFF the FETs 71 to 76; and magnetic flux for the commutation voltage supplying direction of 330 deg is produced by respectively turning ON, OFF OFF, OFF, ON, and OFF the FETs 71 to 76, The motor 10 in this embodiment constitutes "brushless motor"; the current detection unit 30 constitutes "current detecting means"; the voltage supply unit 20 constitutes "voltage supplying means"; the control unit 40 constitutes "voltage supply controlling means," "supply period acquiring means (counting means)," "rotor position estimating means," and "motor start-up controlling means." The processing of S100, S102, and S105 of the flow in FIG. 3 corresponds to the processing of "voltage supply controlling means"; the count processing carried out at S100 to S104 corresponds to the processing of "supply period acquiring means"; the processing of S107 corresponds to the processing of "rotor position estimating means"; and the processing of S108 and S109 corresponds to the processing of "motor start-up controlling means." The processing of S100 of the flow in FIG. 3 corresponds to "Procedural Step (1)"; the processing of S101 and S102 corresponds to "Procedural Step (2)"; the processing of S103 to S105 corresponds to "Procedural Step (3)"; the processing of S106 corresponds to "Procedural Step (4)"; the processing of S107 corresponds to "Procedural Step (5)"; and the processing of S108 and S109 corresponds to "Procedural Step (6)."

Description will be given to the effect produced by the start-up control system 1 for brushless motors in this embodiment. In order to make it easy to understand the description, first, a comparative example for determining rotor stop position by comparing peak value of current is described, and then, the case of the embodiment is described.

Figure 7A:
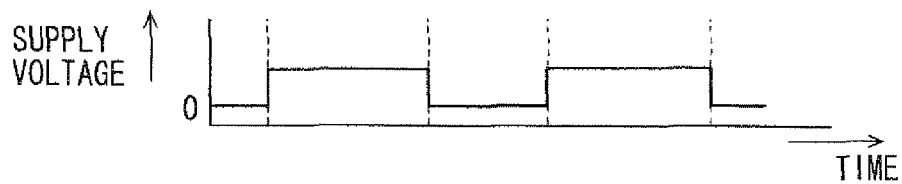
FIGS. 7A and 7B are graphs attached as explanatory drawings illustrating a comparative example.
Figure 7B:
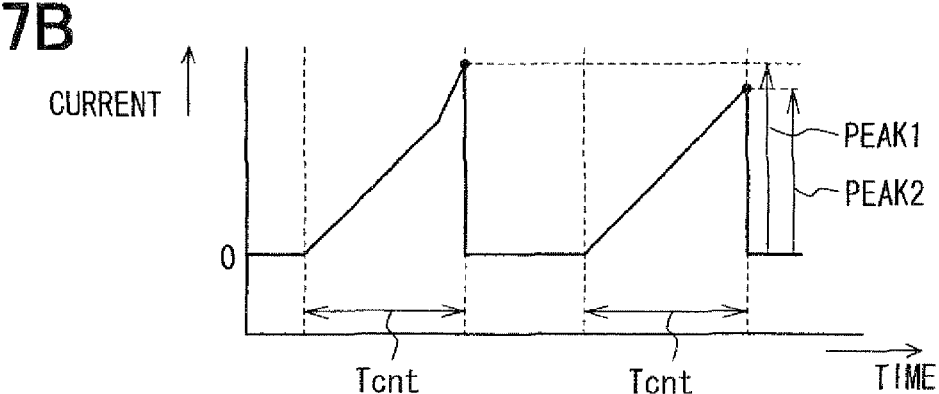

In the comparative example shown in FIGS. 7A and 7B, the voltage supply time Tcnt is constant. In the case that voltage is supplied in each direction only for a constant period of time, magnetic saturation is prone to occur when the magnetic flux produced by the rotor 14 itself and the magnetic flux produced by the coil under voltage supply are in the same direction. Consequently, the peak amplitude values PEAK1 and PEAK2 of current may be compared. However, it there is a significant voltage drop, an amount of magnetic flux produced by the coil may be reduced, and magnetic saturation may be avoided. Therefore, in the comparative example, the rotor stop position can not be estimated accurately. In addition, since the voltage supply time Tcnt is constant, if there is a voltage rise, current value is also increased as voltage is increased. For withstanding such an increased voltage and current, it is necessary to use circuit elements that can withstand large current, and to increase the size of the system.

Figure 7C:
FIGS. 7C to 7E are graphs attached as explanatory drawings illustrating waveforms of the embodiment.
Figure 7D:
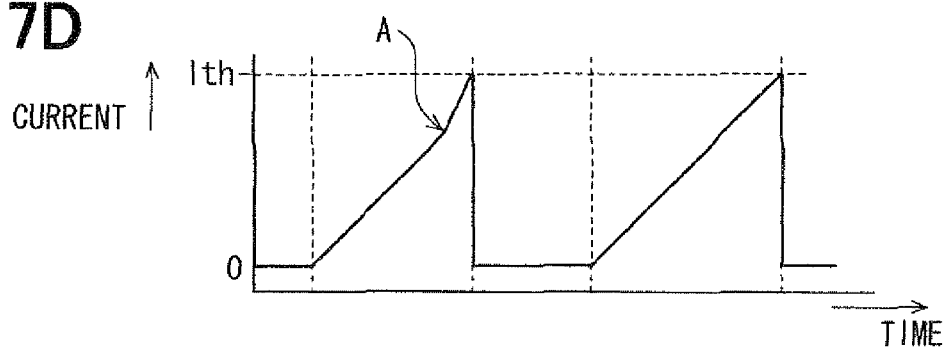
Figure 7E:
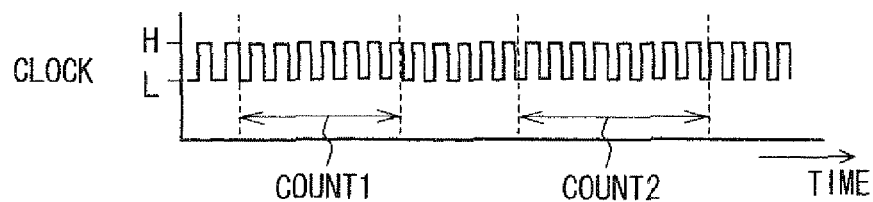

Referring to a set of FIGS. 7C to 7E, in this embodiment, meanwhile, voltage is supplied until current reaches to a current threshold value Ith as illustrated in FIG. 7D. Then the time from when voltage supply is started to when voltage supply is terminated is counted based on clock. When the three phase coils 11, 12, 13 are magnetically saturated, the inductance of the coils is rapidly reduced and as a result, the degree of increase in current is increased. In the example in FIG. 7D, for example, the degree of increase in current is increased at the point indicated by symbol (A). Therefore, it can be estimated that the north pole of the rotor 14 is positioned in the voltage supplying direction in which the count based on clock is minimized. In the case of behavior illustrated in FIGS. 7C to 7E, the number of clock pulses such as COUNT1 and COUNT2 are compared to determine the specific direction in which the count is minimum.

In this embodiment, voltage is continuously supplied until current reaches to the current threshold value Ith even though power source voltage drops. Therefore, it is possible to magnetically saturate the three phase coils 11, 12, 13 and avoid degradation in the accuracy of rotor position estimation. Even though power source voltage rises, the supply of voltage is terminated when the current threshold value Ith is reached. For this reason, it is unnecessary to make circuit elements and the like capable of withstanding large current and compact systems can be designed.

In this embodiment, the following processing is carried out when the maximum voltage supply time has passed (S103: YES) after the supply of voltage is started (S100 of the flow in FIG. 3): counting is terminated and the supply of voltage is terminated (S104 and S105). This makes it possible to prevent the time required to supply voltage for magnetically saturating the three phase coils 11, 12, 13 from becoming too long, for example, when power source voltage significantly drops.

Other Embodiments

In the above described embodiment, the invention is applied to a start-up control system for brushless motors for driving a vehicle fuel pump. The invention is not limited to this and can be applied to any motor driven apparatus having a brushless motor.

Figure 8:
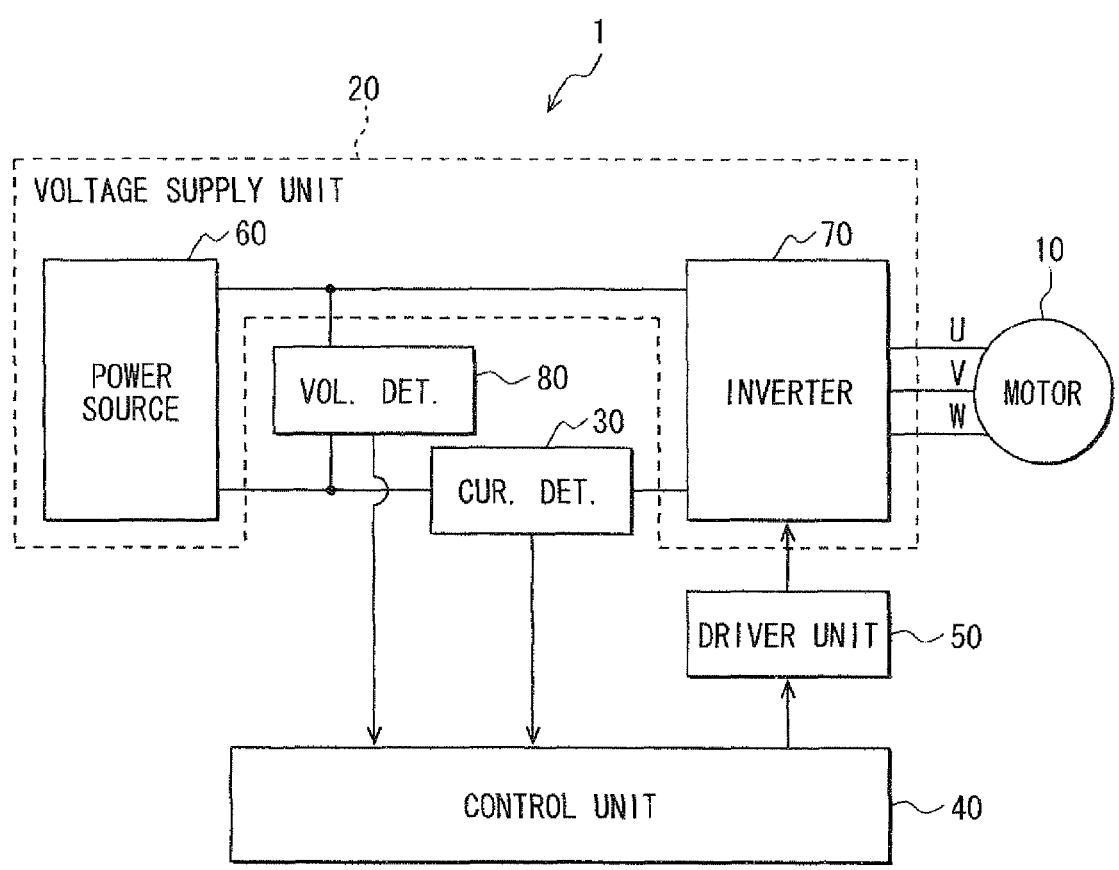
FIG. 8 is a block diagram illustrating a start-up control system for brushless motors in another embodiment of the invention.

In the above described embodiments, the current threshold value Ith is set as a fixed value. However, it is possible to vary the current threshold value Ith based on the power source voltage detected by a power source voltage detecting unit. For this purpose, as shown in FIG. 8, the system 1 may include a voltage detecting unit 80 for detecting power source voltage, and for varying the current threshold value Ith in accordance with the detected power source voltage. For example, the current threshold value Ith may be set smaller value than a reference value as a voltage drop of the power source voltage is increased. In this example, it is possible to prevent the time required to supply voltage for magnetically saturating the three phase coils 11, 12, 13 from becoming too long. For example, the current threshold value Ith may be set greater value than a reference value as a voltage rise of the power source voltage is increased. In this example, it is possible to acquire a voltage supplying period of time properly, even if the voltage rises. As a result, it is possible to estimate the rotor stop position accurately.

Although the present invention has been fully described in connection with the preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. An apparatus for estimating rotor position for brushless motors which includes a brushless motor having a stator with coils wound thereon and a rotor rotatably supported relative to the stator and estimates the stop position of the rotor, the estimating apparatus comprising:
   a current detecting means for directly or indirectly detecting wiring current which is current passed through the coils;
   a voltage supplying means capable of supplying voltage to the coils so that magnetic flux is produced in each of a plurality of directions perpendicular to the direction of rotation of the rotor;
   a voltage supply controlling means which controls the voltage supplying means so that magnetic flux is produced in sequence in predetermined directions among the directions and, when the wiring current detected at the current detecting means exceeds a predetermined threshold value, terminates the supply of voltage by the voltage supplying means;
   a supply period acquiring means which acquires a period equivalent value equivalent to a voltage supply period in each direction in which magnetic flux is produced under control of the voltage supply controlling means; and
   a rotor position estimating means which compares period equivalent values to identify a direction in which the voltage supply period is minimized and estimates the stop position of the rotor based on the identified direction.

2. The apparatus for estimating rotor position for brushless motors of claim 1,
   wherein the supply period acquiring means is comprised of a counting means for doing count during the voltage supply period and a count by the counting means is acquired as the period equivalent value.

3. The apparatus for estimating rotor position for brushless motors of claim 1,
   wherein the rotor position estimating means considers a magnetic pole of the rotor to be positioned within a predetermined angular range in the direction of rotation of the rotor based on the direction in which the period equivalent value is minimized and thereby estimates the stop position of the rotor.

4. The apparatus for estimating rotor position for brushless motors of claim 1,
   wherein, when the wiring current detected at the current detecting means does not exceed a predetermined threshold value and a predetermined time has passed, the voltage supply controlling means terminates the supply of voltage by the voltage supplying means.

5. The apparatus for estimating rotor position for brushless motors of claim 4,
   wherein the predetermined time is so set that the wiring current reaches the predetermined threshold value in at least one direction among predetermined directions in which voltage is supplied.

6. The apparatus for estimating rotor position for brushless motors of claim 1, further comprises,
   a means for detecting the voltage of a power source for supplying voltage to the coils, and for varying the predetermined threshold value in accordance with the detected voltage.

7. A start-up control system for brushless motors which includes a brushless motor having a stator with coils wound thereon and a rotor rotatably supported relative to the stator and carries out start-up control on the brushless motor, the control system comprising:
   a current detecting means for directly or indirectly detecting wiring current which is current passed through the coils;
   a voltage supplying means capable of supplying voltage to the coils so that magnetic flux is produced in each of a plurality of directions perpendicular to the direction of rotation of the rotor;
   a voltage supply controlling means which controls the voltage supplying means so that magnetic flux is produced in sequence in predetermined directions among the directions and, when the wiring current detected at the current detecting means exceeds a predetermined threshold value, terminates the supply of voltage by the voltage supplying means;
   a supply period acquiring means which acquires a period equivalent value equivalent to a voltage supply period in each direction in which magnetic flux is produced under control of the voltage supply controlling means;
   a rotor position estimating means which compares period equivalent values to identify a direction in which the voltage supply period is minimized and estimates the stop position of the rotor based on the identified direction; and
   a motor start-up controlling means which determines a direction of magnetic flux for causing commutation in the rotor from among the directions based on the stop position of the rotor estimated at the rotor position estimating means, and controls the voltage supplying means so as to produce magnetic flux in that direction and starts the brushless motor.

8. The start-up control system for brushless motors of claim 7,
   wherein the supply period acquiring means is comprised of a counting means for doing count during the voltage supply period and acquires a count by the counting means as the period equivalent value.

9. The start-up control system for brushless motors of claim 7,
   wherein the rotor position estimating means considers a magnetic pole of the rotor to be positioned within a predetermined angular range in the direction of rotation of the rotor based on the direction in which the voltage supply period is minimized and thereby estimates the stop position of the rotor.

10. The start-up control system for brushless motors of claim 7,
    wherein, when the wiring current detected at the current detecting means does not exceeds a predetermined threshold value and a predetermined time has passed, the voltage supply controlling means terminates the supply of voltage by the voltage supplying means.

11. The start-up control system for brushless motors of claim 10,
    wherein the predetermined time is so set that the wiring current reaches the predetermined threshold value in at least one direction among predetermined directions in which voltage is supplied.

12. The start-up control system for brushless motors of claim 7, further comprises,
    a means for detecting the voltage of a power source for supplying voltage to the coils, and for varying the predetermined threshold value in accordance with the detected voltage.

13. A start-up control method for brushless motors which includes a brushless motor having a stator with coils wound thereon and a rotor rotatably supported relative to the stator and is used to carry out start-up control on the brushless motor, the control method comprising:

first step of supplying voltage to the coils so that magnetic flux is produced in predetermined directions among a plurality of directions perpendicular to the direction of rotation of the rotor and starting counting at the same time;

second step of determining that wiring current which is current passed through the coils has exceeded a predetermined threshold value;

third step of, when the wiring current is determined to have exceeded the predetermined threshold value, terminating the supply of the voltage and terminating counting;

fourth step of repeating the steps including the first step to the third step in all the predetermined directions;

fifth step of estimating the stop position of a rotor based on a direction in which the count is minimized from among the predetermined directions; and sixth step of determining a direction of magnetic flux for causing commutation in the rotor from among the directions based on the estimated stop position of the rotor, and controlling the voltage supplying means so as to produce magnetic flux in that direction and starting the brushless motor.

14. The start-up control method for brushless motors of claim 13,
wherein at the fifth step, a magnetic pole of the rotor is considered to be positioned within a predetermined angular range in the direction of rotation of the rotor based on the direction in which the count is minimized and the stop position of the rotor is thereby estimated.

15. The start-up control method for brushless motors of claim 13,
wherein at the third step, the supply of the voltage is terminated when the wiring current does not exceed a predetermined threshold value and a predetermined time has passed.

16. The start-up control method for brushless motors of claim 15,
wherein the predetermined time is so set that the wiring current reaches the predetermined threshold value in at least one direction among predetermined directions in which voltage is supplied.

17. The start-up control method for brushless motors of claim 13, further comprises,
preceding step of, performed before the third step, varying the predetermined threshold value in accordance with a detected voltage of the power source.

* * * * *